United States Patent
Krauter et al.

(10) Patent No.: US 8,140,216 B2
(45) Date of Patent: Mar. 20, 2012

(54) METHOD OF DETECTING MANIPULATION OF A PROGRAMMABLE MEMORY DEVICE OF A DIGITAL CONTROLLER

(75) Inventors: Immanuel Krauter, Burgstetten (DE); Claus Moessner, Ispringen (DE); Axel Aue, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/414,404

(22) Filed: Mar. 30, 2009

(65) Prior Publication Data
US 2009/0187305 A1    Jul. 23, 2009

Related U.S. Application Data

(63) Continuation of application No. 09/749,050, filed on Dec. 27, 2000, now abandoned.

(30) Foreign Application Priority Data

Dec. 28, 1999    (DE) .................................. 199 63 208

(51) Int. Cl.
*G06F 7/00*     (2006.01)
*G06F 19/00*    (2011.01)
*G06F 17/30*    (2006.01)

(52) U.S. Cl. ............................... 701/35; 701/115; 726/2

(58) Field of Classification Search ............... 701/1, 32, 701/54, 115, 35; 726/2, 34
See application file for complete search history.

(56) References Cited

U.S. PATENT DOCUMENTS

| 5,303,163 | A |   | 4/1994 | Ebaugh et al. |
| 5,658,250 | A | * | 8/1997 | Blomquist et al. ............... 604/65 |
| 5,742,616 | A | * | 4/1998 | Torreiter et al. ............... 714/732 |
| 5,787,367 | A | * | 7/1998 | Berra ................................. 701/1 |
| 5,802,485 | A | * | 9/1998 | Koelle et al. ..................... 701/29 |
| 5,941,915 | A |   | 8/1999 | Federle et al. |
| 6,044,014 | A | * | 3/2000 | Komori et al. ........... 365/185.04 |
| 6,081,447 | A | * | 6/2000 | Lofgren et al. .......... 365/185.02 |
| 6,219,282 | B1 | * | 4/2001 | Tanaka ..................... 365/185.33 |
| 6,687,325 | B1 | * | 2/2004 | Wells ............................... 377/26 |
| 6,904,400 | B1 | * | 6/2005 | Peri et al. ........................ 703/28 |

FOREIGN PATENT DOCUMENTS

| DE | 196 15 105 | 10/1997 |
| DE | 197 23 332 | 9/1998 |

* cited by examiner

*Primary Examiner* — James P Trammell
*Assistant Examiner* — Muhammad Shafi
(74) *Attorney, Agent, or Firm* — Kenyon & Kenyon LLP

(57) ABSTRACT

A method of detecting manipulation of a programmable memory device of a digital controller for a motor vehicle is described; data and control programs for operation of the controller and for control/regulation of certain functions of the motor vehicle can be stored in the memory device. To permit especially reliable detection of manipulation in the simplest possible way, in conjunction with each programming/reprogramming operation of the programmable memory device, information regarding the programming/reprogramming operation is stored in a separate memory area of the memory device where only reading and programming are possible, and in order to detect manipulation, the content of the separate memory area is read out and compared with given information.

13 Claims, 2 Drawing Sheets

METHOD OF DETECTING MANIPULATION OF A PROGRAMMABLE MEMORY DEVICE OF A DIGITAL CONTROLLER

RELATED APPLICATION INFORMATION

The present application is a continuation of U.S. patent application Ser. No. 09/749,050 filed on Dec. 27, 2000, now abandoned which claims priority to German Application DE 199 63 208.1 filed on Dec. 28, 1999, and which are hereby incorporated by reference in their entirety.

FIELD OF THE INVENTION

The present invention relates to a method of detecting manipulation of a programmable memory device of a digital controller for a motor vehicle, where data and control programs for operation of the controller and for control/regulation of certain functions of the motor vehicle can be stored in the memory device. The present invention also relates to an external programming unit for programming and/or reprogramming a flash memory of a digital controller for a motor vehicle, where data and control programs for operation of the controller and for control/regulation of certain functions of the motor vehicle can be stored in the flash memory. Finally, the present invention also relates to a digital controller for a motor vehicle having a programmable memory device for storing data and control programs for operation of the controller and for control/regulation of certain functions of the motor vehicle.

BACKGROUND INFORMATION

A method of detecting the manipulation of a programmable memory device of the type defined above is known, for example, from German Published Patent Application No. 196 15 105. A controller described there contains a microcomputer, a first programmable memory device and a second programmable memory device. The first memory device is designed as an erasable non-volatile flash EPROM. The second memory device is designed as an EEPROM. Data and control programs for operation of the controller and for control/regulation of certain functions of the motor vehicle are stored in the first programmable memory device. For execution of the control/regulatory functions assigned to the microcomputer and for self-control, the microcomputer processes the control programs which are stored in the first memory device together with data that might be needed to execute the programs.

For programming/reprogramming the controller, an external programming unit is provided and is connected by a serial interface to the controller. The programming unit causes the controller to erase the data and/or control programs stored in the first memory device and then causes a new control program and/or new data to be stored in the first programmable memory device.

In conjunction with programming/reprogramming the first memory device, i.e., before, during and/or after erasing and/or overwriting the first memory device, the programming/reprogramming operation is documented by storing the corresponding information in the second programmable memory device. Storing the information during the programming/reprogramming operation is preferable because, due to time interleaving of the programming/reprogramming of the first memory device and the storage of information in the second memory device, the possibility of reprogramming the first memory device without storing information regarding the programming/reprogramming operation in the second memory is extremely low.

Various conclusions can be drawn on the basis of the information stored in the second memory device. First, disturbances in programming/reprogramming the controller due to a defective external programming unit can be detected rapidly and correctly. Second, unauthorized manipulation of the control program in the first memory device can be detected and sometimes even traced back to the unauthorized manipulator on the basis of the stored information. Detection of an unauthorized manipulation of the controller is important because defects in the controller or in the units of the motor vehicle controlled or regulated by the controller can occur due to a faulty control program or a control program not aimed at error-free operation of the internal combustion engine of the motor vehicle. Unauthorized manipulation of the control program usually makes any warranty or liability claims null and void.

A disadvantage of the method known from the related art is that it cannot readily be used with a traditional controller which has only the first programmable memory device. The controller is first expanded by the second programmable memory device. In addition, the microcomputer of the controller not only has access to the first memory device but also has access to the second programmable memory device. The information regarding the programming/reprogramming operation to be stored in the second memory device is also very complex, so the time for programming/reprogramming the memory device of the controller is greatly increased.

Furthermore, the second memory device is erased before storing the information. This means that the second memory device can also be erased by any unauthorized person having access to appropriate knowledge and hardware and can be overwritten with new information. Thus, with the method known from the related art, unauthorized manipulation of the control program of the controller cannot be detected reliably.

SUMMARY OF THE INVENTION

An object of the present invention is thus to design and improve upon a method such that unauthorized manipulation of the control program in the controller can be detected reliably and easily.

Therefore, the present invention proposes that in conjunction with each programming/reprogramming operation of the programmable memory device, information regarding the programming/reprogramming operation can be stored in a separate memory area of the memory device where only reading and programming are possible, and in order to detect manipulation, the content of the separate memory area is read out and compared with given information.

The method according to the present invention has the advantage that the information regarding the programming/reprogramming operation is not stored in a second programmable memory device as in the related art but instead is stored within the programmable memory device where the control program is also stored. The information is stored within the memory device in a memory area where only reading and programming are possible, i.e., this memory area cannot be erased. This memory area lacks the hardware requirements (e.g., a line for erasing) for erasing it. It is thus impossible to erase this memory area of the programmable memory device under any circumstances.

The information regarding the programming/reprogramming operation stored in the memory area can be documented. If the motor vehicle then enters a workshop and warranty claims are made or if the memory device of the controller is to be reprogrammed, the content of the separate memory area can be read out and compared with the documented content of the memory area. If the information stored in the separate memory area matches the documented information, then there has not been unauthorized manipulation of the controller. If the information read out of the memory area does not match the documented information, then there has been unauthorized manipulation of the controller. In such a case, warranty claims or liability claims, for example, can be refused.

According to a preferred refinement of the present invention, information regarding the cumulative number of programming/reprogramming operations is stored in the memory area of the programmable memory device. Thus, with each programming/reprogramming operation, the number stored in the separate memory area is incremented. The number of programming/reprogramming operations is documented. The number stored in the separate memory area can be read out on demand and compared with the documented number. If the two numbers do not match, there has been an undocumented and therefore unauthorized programming/reprogramming operation. According to this refinement, the information stored in the separate memory area is reduced to the minimum amount of data needed to detect unauthorized manipulation of the controller.

According to a preferred embodiment of the present invention, the information regarding the programming/reprogramming operation is stored in the separate memory area with each erase operation of the programmable memory device. According to this embodiment, it is assumed that the programmable memory device is erased before programming/reprogramming the control program. The programmable memory device is also erased before programming/reprogramming the control program if the control program is secured with a seed-and-key method, as is known in the related art for preventing unauthorized manipulation, in addition to the method according to the present invention. The seed-and-key method is described in detail in German Published Patent Application No. 197 23 332, to which reference is herewith made explicitly.

In the seed-and-key method, a reference word is formed and stored by a programmer in conjunction with programming/reprogramming the controller as a function of the content of the programmable memory area and a key. Before executing the control program, a code word is formed and compared with the reference word inside the controller on the basis of the programmable memory area content and the key. If the code word matches the reference word, the control program is executed; otherwise, it is blocked, because the reference word is assumed to be incorrect because the programmer did not know the key and therefore this is a case of unauthorized programming/reprogramming. If the content of the programmable memory device is not erased before each programming/reprogramming, checksum errors may occur in forming the reference word or the code word.

According to another preferred embodiment of the present invention, the information is stored by setting bits in the separate memory area. Thus, for example, it is conceivable for an additional bit to be set in the memory area in conjunction with each programming/reprogramming operation to thereby store the cumulative number of programming/reprogramming operations. This embodiment is a type of method of storing information regarding the programming/reprogramming operation in the separate memory area that saves on storage space and reduces storage time in particular.

According to another advantageous refinement of the present invention, the information is stored in a one-time-programmable (OTP) region of a programmable memory device designed in the form of a flash memory. The OTP region involves one or more cells of the flash memory having no line for erasing the content of the flash cells. The flash cells of the OTP region have only lines for programming or reading the content of the flash cells. The flash memory is designed as a flash EPROM, for example.

A flash memory is preferably programmed or reprogrammed with the help of an external programming unit, in particular with the help of a state machine. In a state machine, the sequences of operations for programming/reprogramming the programmable memory device of a controller are encoded in the hardware. The sequences of operations for storing the information in the memory area are also encoded in the hardware in the state machine. In this way, manipulation of the storage operation of information in the separate memory area can be prevented effectively, and manipulation of the memory device can be reliably detected. As an alternative, the information from an element of the controller for storing information regarding the programming/reprogramming operation is stored in the separate memory area. According to this alternative embodiment, the information is thus stored in the memory area in conjunction with the programming/reprogramming operation by a suitable element of the controller. The programming/reprogramming of the memory area can take place through an external programming unit, for example, as in the past. The element of the controller has a sequence of operations encoded in the hardware of the controller for example, necessarily causing the information to be stored in the separate memory area with each programming/reprogramming operation of the memory device.

To carry out the method according to the present invention, starting from the external programming unit, the programming unit has an element for carrying out the method according to the present invention. Such an external programming unit is also known as a state machine. A state machine is characterized in that the sequences of operations for programming/reprogramming the control program in the memory device and for storing the information in the separate memory area are encoded in the hardware, and the functionality is written in very high description language (VHDL). VHDL is a hardware description language which writes digital circuits on different levels (behavior, register transfer logic (RTL)). The external programming unit may be connected to the controller over a serial interface, for example, or by a K line and a diagnostic plug.

Finally, starting from a digital controller, to carry out the method according to the present invention, the controller has an element for carrying out the method according to the present invention. The information regarding the programming/reprogramming operation is thus not stored in the separate memory area by external devices but instead this information is stored by an internal element which is part of the controller.

DETAILED DESCRIPTION

Figure 1:
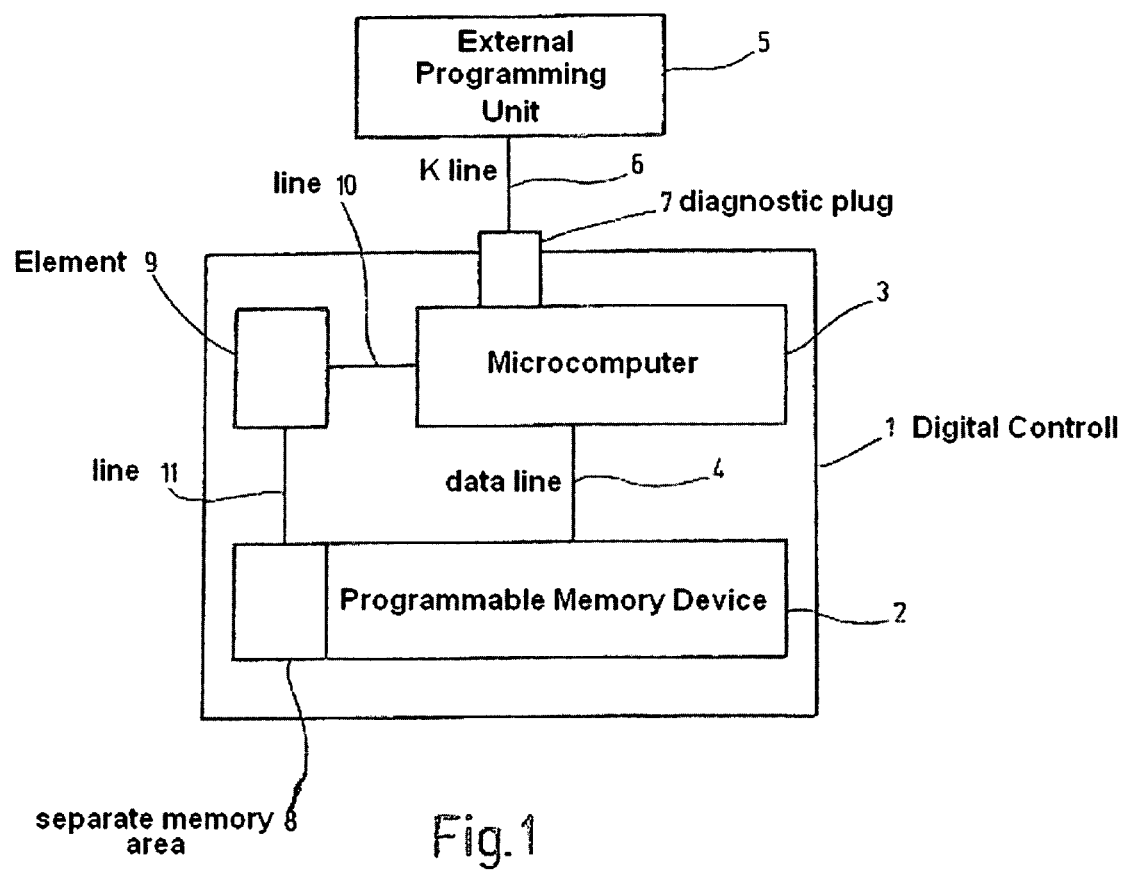
FIG. 1 shows a digital controller for a motor vehicle for carrying out the method according to the present invention as in a preferred embodiment.
Figure 2:
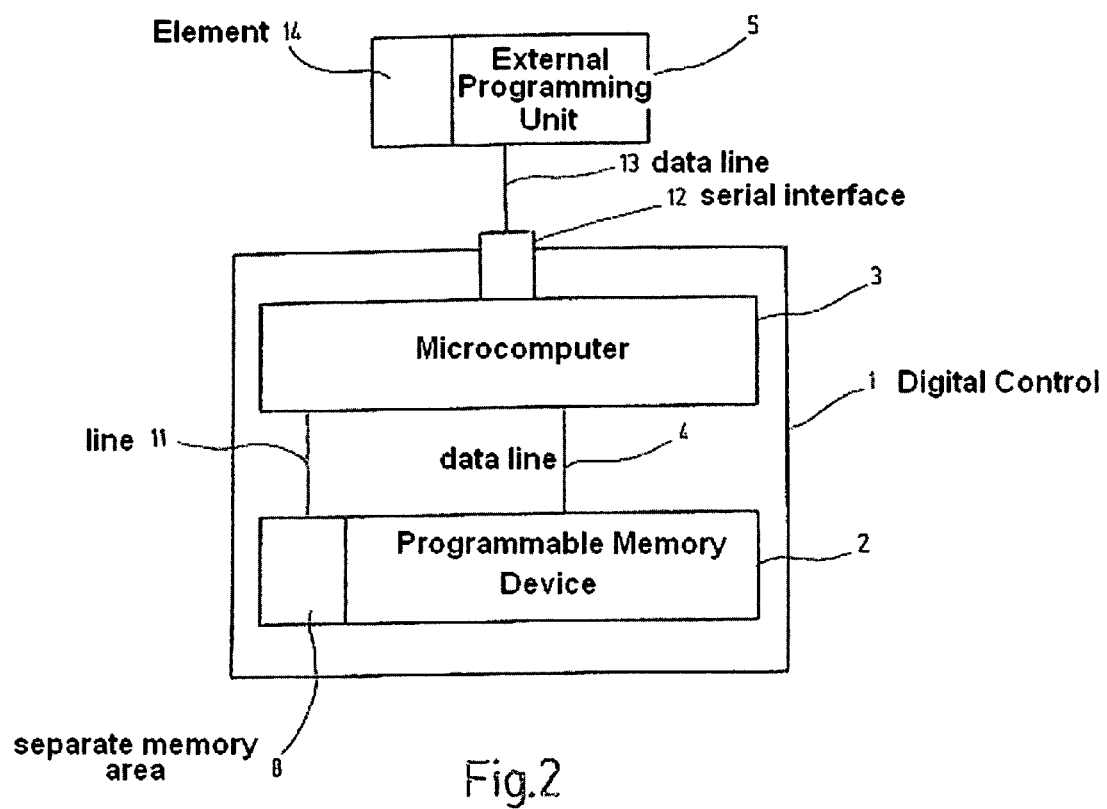
FIG. 2 a digital controller for a motor vehicle having an external programming unit for carrying out the method according to the present invention as in a second preferred embodiment.

The explanations given below relate to a method of detecting manipulation of a programmable memory device of a digital controller for a motor vehicle, in particular for controlling the internal combustion engine, the transmission or the brakes of the motor vehicle. FIGS. 1 and 2 show a digital controller 1 in its entirety. It has a programmable memory device 2, where data and control programs for operation of controller 1 and for controlling/regulating certain functions of the motor vehicle can be stored. Controller 1 also has a microcomputer 3 which processes the control programs stored in memory device 2 for execution of the control/regulatory function allocated to it and for self-control. The control program and the data needed for execution of the control program are transmitted over a data line 4 from memory device 2 to microcomputer 3.

Memory device 2 of controller 1 is programmed/reprogrammed by way of an external programming unit 5 connected to controller 1 over a serial interface, for example. External programming unit 5 is designed as a state machine, characterized in that the sequences of operations for programming/reprogramming controller 1 are encoded in the hardware. In the embodiment in FIG. 1, external programming unit 5 is connected to controller 1 by a K line 6 and a diagnostic plug 7. For programming/reprogramming of controller 1, the new data and/or the new control program is transmitted to programmable memory device 2 over K line 6, microcomputer 3 and data line 4.

Programmable memory device 2 is designed as a flash EPROM. A flash EPROM has a separate memory area 8, the one-time-programmable (OTP) region. This separate memory area 8 of programmable memory device 2 has a plurality of flash cells having no line for erasing the memory content of the flash cells. The flash cells of separate memory area 8 only have lines for programming and for reading the content of the flash cells.

According to the present invention, information regarding the programming/reprogramming operation is stored in separate memory area 8 of memory device 2 in conjunction with each programming/reprogramming operation of programmable memory unit 2. Controller 1 therefore has an element 9 to receive from microcomputer 3 over a line 10 information regarding when memory device 2 is erased or programmed. Element 9 then stores information regarding the programming/reprogramming operation in separate memory area 8 following each erase operation and each programming operation of programmable memory device 2 over a line 11.

Information stored in memory area 8 preferably includes the cumulative number of programming/reprogramming operations of memory device 2. For storing the cumulative number of programming/reprogramming operations, a bit is set in separate memory area 8 for each programming/reprogramming operation executed.

The information regarding the programming/reprogramming operation stored in memory area 8 is documented. When the motor vehicle is taken to a workshop and warranty claims are made or if memory device 2 of controller 1 is to be reprogrammed, the content of separate memory area 8 can be read out and compared with the documented information in memory area 8. If the information stored in separate memory area 8 matches the documented information, there has not been any unauthorized manipulation of controller 1. If the information read out of memory area 8 does not match the documented information, then there has been an unauthorized manipulation of controller 1. In such a case, warranty or liability claims can be refused.

Data stored in memory device 2 is protected against unauthorized manipulation of the control program by a seed-and-key method which is described in detail in German Published Patent Application No. 197 23 332.

FIG. 2 illustrates an alternative embodiment for implementation of the method according to the present invention. In contrast with the embodiment according to FIG. 1, external programming unit 5 in this embodiment is connected to controller 1 via a serial interface 12 and a data line 13. Programming unit 5 has an element 14 by which information regarding the programming/reprogramming operation in conjunction with each programming/reprogramming operation of programmable memory device 2 is stored in separate memory area 8. Element 14 is designed as an electric circuit, for example, causing microcomputer 3 of controller 1 to set certain bits in memory area 8 over line 11 before, during or after the programming/reprogramming operation.

What is claimed is:

1. A method for detecting a manipulation of a programmable memory device of a digital controller for a motor vehicle, the method comprising:

storing in the programmable memory device data and control programs for an operation of the digital controller and for a control/regulation of functions of the motor vehicle;

storing information regarding a programming/reprogramming operation in a separate memory area of the programmable memory device where only reading and programming are possible, wherein the separate memory area is a one-time-programmable (OTP) region of the programmable memory device, the storing of the information regarding the programming/reprogramming operation being performed in conjunction with each programming/reprogramming operation of the programmable memory device, the stored information recording a number of times the programmable memory device has been programmed/reprogrammed; and reading out and comparing a content of the separate memory area with another set of information in order to detect a manipulation, wherein the separate memory area is incapable of being erased, and wherein a remaining memory area of the programmable memory device is capable of being erased;

wherein the information regarding the programming/reprogramming operation stored in the separate memory area is documented, so that if (i) the motor vehicle enters a workshop and warranty claims are made, or (ii) if the memory of the controller is to be reprogrammed, the content of the separate memory area is read out and compared with a documented information of the memory area, and if the information stored in the separate memory area matches the documented information, then there has not been an unauthorized manipulation of the controller, and if the information read out of the memory area does not match the documented information, then there has been an unauthorized manipulation of the controller.

2. The method according to claim 1, further comprising:

storing in the separate memory area information regarding a cumulative number of programming/reprogramming operations of the programmable memory device.

3. The method according to claim 1, further comprising:

storing in the separate memory area the information regarding the programming/reprogramming operation with each erase operation of the programmable memory device.

4. The method according to claim 1, wherein the information regarding the programming/reprogramming is stored in the separate memory area by setting bits.

5. The method according to claim 1, further comprising:
storing the information regarding the programming/reprogramming in a one-time-programmable region of the programmable memory device, the programmable memory device being arranged as a flash memory.

6. The method according to claim 1, further comprising:
storing in the separate memory area information from an external programming unit for programming/reprogramming a flash memory.

7. The method according to claim 1, further comprising:
storing in the separate memory area information from an arrangement of the digital controller for storing the information regarding the programming/reprogramming operation.

8. The method according to claim 1, wherein the separate memory area has no hardware for performing an erase operation thereon.

9. The method according to claim 1, wherein information regarding the cumulative number of programming/reprogramming operations is stored in the memory area of the programmable memory device, so that with each programming/reprogramming operation, the number stored in the separate memory area is incremented. The number of programming/reprogramming operations is documented. The number stored in the separate memory area can be read out on demand and compared with the documented number. If the two numbers do not match, there has been an undocumented and therefore unauthorized programming/reprogramming operation. According to this refinement, the information stored in the separate memory area is reduced to the minimum amount of data needed to detect unauthorized manipulation of the controller.

10. The method according to claim 9, wherein the information regarding the programming/reprogramming operation is stored in the separate memory area with each erase operation of the programmable memory device, the programmable memory device being erased before programming/reprogramming the control program.

11. The method according to claim 9, wherein the information is stored by setting bits in the separate memory area, an additional bit to be set in the memory area in conjunction with each programming/reprogramming operation to store a cumulative number of programming/reprogramming operations.

12. The method according to claim 9, wherein the information is stored in the one-time-programmable (OTP) region of the programmable memory device, which is a flash EPROM memory, wherein the OTP region involves at least one cell of the flash memory having no line for erasing the content of the flash cells, and wherein the flash cells of the OTP region have only lines for programming or reading the content of the flash cells.

13. The method according to claim 9, wherein:
the information regarding the programming/reprogramming operation is stored in the separate memory area with each erase operation of the programmable memory device, the programmable memory device being erased before programming/reprogramming the control program,
the information is stored by setting bits in the separate memory area, an additional bit to be set in the memory area in conjunction with each programming/reprogramming operation to store a cumulative number of programming/reprogramming operations, and
the information is stored in the one-time-programmable (OTP) region of the programmable memory device, which is a flash EPROM memory, wherein the OTP region involves at least one cell of the flash memory having no line for erasing the content of the flash cells, and wherein the flash cells of the OTP region have only lines for programming or reading the content of the flash cells.

* * * * *